United States Patent [19]

Mairot et al.

[11] Patent Number: 4,479,562
[45] Date of Patent: Oct. 30, 1984

[54] WEIGHING APPARATUS FOR USE AS SCALE FOR PERSONS

[75] Inventors: Guy Mairot; Jean P. Aumard, both of Annemasse, France

[73] Assignee: Terraillon, Annemasse, France

[21] Appl. No.: 399,524

[22] Filed: Jul. 19, 1982

[30] Foreign Application Priority Data

Jul. 31, 1981 [CH] Switzerland ............ 4972/81

[51] Int. Cl.³ .................................. G01G 21/18
[52] U.S. Cl. ........................ 177/256; 177/DIG. 9
[58] Field of Search ............ 177/256, 257, 258, 211, 177/DIG. 9

[56] References Cited

U.S. PATENT DOCUMENTS 3,193,034 7/1965 Hutchinson .......... 177/256 X
3,844,365 10/1974 Ek ............................ 177/256
4,363,368 12/1982 Paddon .................... 177/211

Primary Examiner—Joseph W. Hartary
Attorney, Agent, or Firm—Ladas & Parry

[57] ABSTRACT

The long levers (3a and 3b) are capable of pivoting at one of their ends on a knife (2a and 2d), and two short levers (4a and 4b) are also capable of pivoting at one of their ends on a knife (2b and 2c). At their other end, the short levers (4a and 4b) are coupled by means of a coupling system (9 and 9a) to the long levers (3a and 3b). The other ends of the long levers (3a and 3b) are engaged at a very short distance one from the other with a force transmitting system (29) which is suspended on the free end of a flat spring (18, 21) provided with gauges (20) for measuring the bending of the spring. The gauges are connected to a read-out system through an electric circuit. The force exerted by the long levers (3a and 3b) is applied on a force transmitting system at a very short distance from the plane of symetry of the flat spring (18, 21). As a result, the force received by the flat spring is practicaly vertical and equal (or proportional) to the force exerted by the load on the tray, even when the load is unevenly distributed on the tray or when the tray is slightly deformed under the load; the accuracy of the measurements is therefore not affected in the above mentioned adverse circumstances.

5 Claims, 13 Drawing Figures

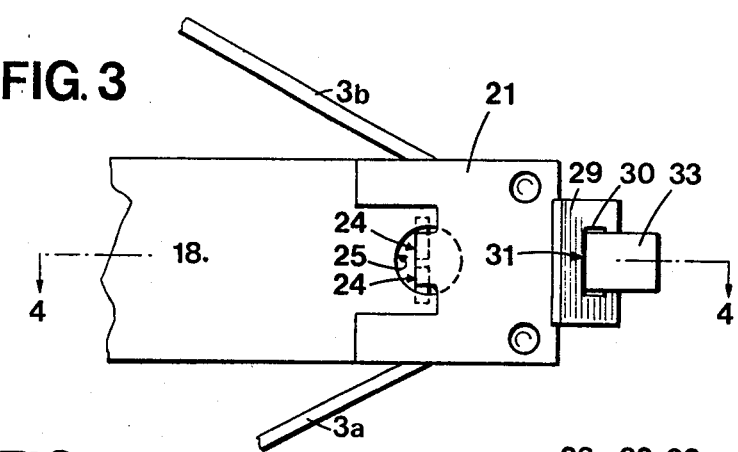
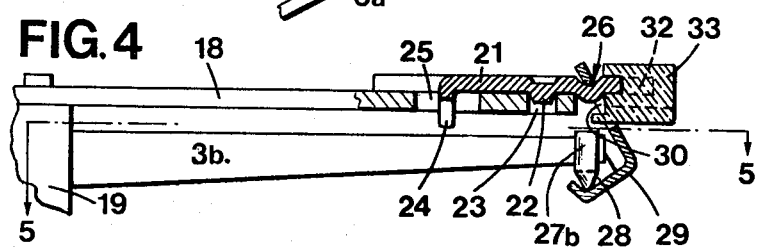
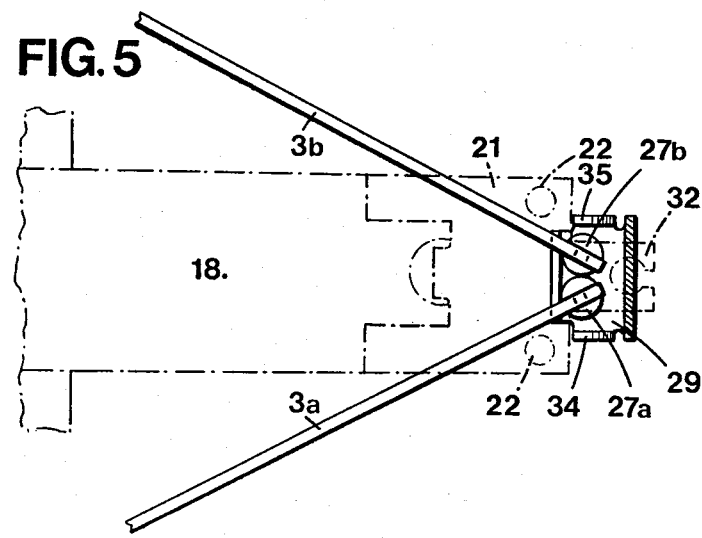

FIG. 12
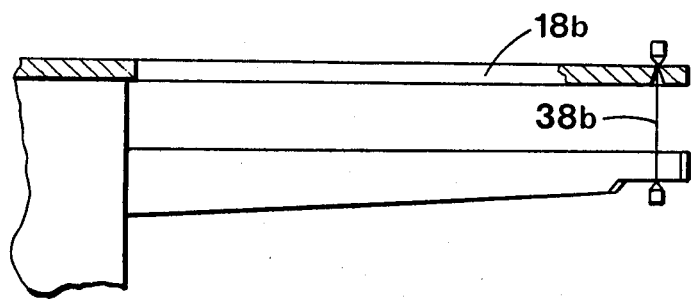
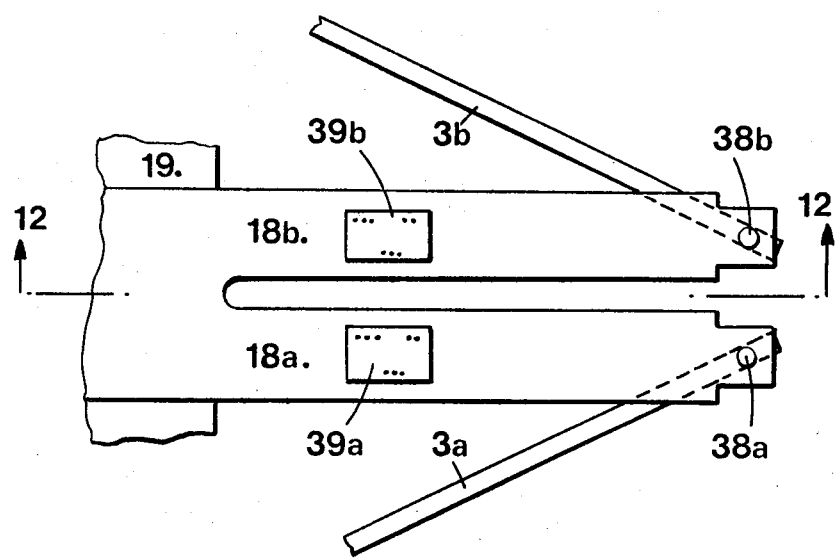
FIG. 13

WEIGHING APPARATUS FOR USE AS SCALE FOR PERSONS

A scale for persons generally comprises a base made of a metal sheet or a plastic material and a weighing mechanism which supports a tray designed to receive the load to be weighed. The weighing mechanism of a scale for persons usually consists of four levers pivoting at their points of support, which are located at the four corners of a rectangle. Each lever receives a part of the force which is exerted by the tray when loaded. The four levers are arranged in such a manner as to transmit to a spring a force which should be proportional or equal to that applied on the scale by the load to be weighed.

In actual practice however, various circumstances can result in a more or less pronounced loss of accuracy. For instance, if the floor on which the scale is installed is not quite level, the base and the tray are to some extent deformed under the load. This in turn results in the levers being deformed, and the force transmitted to the spring not being vertical any more. The precision of the measure is thereby affected; this happens more particularly when a flat spring is used in association with gauges for measuring its bending.

The purpose of our investigation was to reduce these defects so that the errors committed in weighing be minimal. This resulted in the development of the weighing apparatus for use as scale for persons of the present invention, and which is defined in the appended claims.

Reference is made to drawings showing a preferred embodiment of the present invention and various modifications thereof. DR FIG. 1 is a drawing of this preferred embodiment showing the base and the weighing mechanism seen from above, with the tray and load removed.

FIG. 3 shows enlarged a structural element of FIG. 1.

FIG. 4 shows the cross-section 4—4 of FIG. 3.

FIG. 5 shows the cross-section 5—5 of FIG. 4.

FIG. 12 shows the cross-section 12—12 of FIG. 13 and illustrates a fifth modification.

FIG. 13 is a view from above of a similar structural element as shown in FIG. 3 and illustrates the fifth modification.

Figure 1:
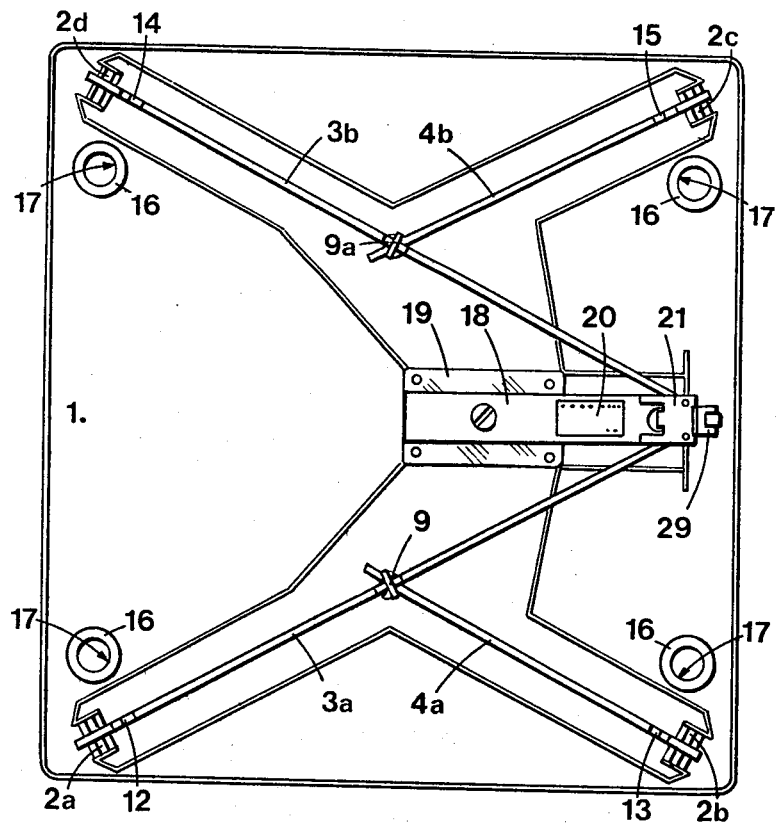

The scale for persons of FIG. 1 comprises a rectangular base 1 made of metal or plastic material which is provided at all four corners with points of support in shape of knives, 2a, 2b, 2c and 2d. Each knife supports at one end one of the four levers 3a, 3b, 4a or 4b of the weighing mechanism.

Figure 2:
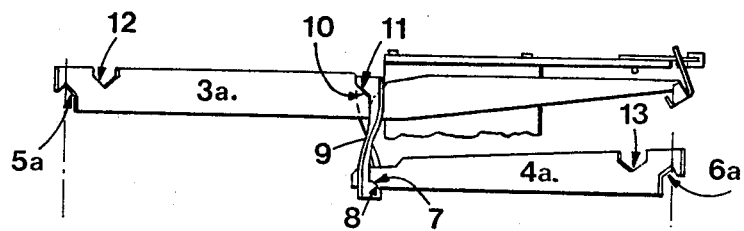
FIG. 2 is a view from one side of the weighing mechanism of FIG. 1

The lever 3a is provided at the end located on the left side of FIG. 2 with a notch 5a which is designed to receive the knife 2a. This arrangement enables the lever to pivot with practically no friction on its point of support. The lever 4a is provided with a similar notch 6a for the knife 2b.

The lever 3b is identical to the lever 3a and is provided with a notch identical to 5a which receives the knife 2d. Further, the lever 4b is identical to 4a and is provided with a notch identical to 6a which receives the knife 2c.

The levers 4a and 4b are shorter than the levers 3a and 3b and are coupled with the latter by their end which is opposite to their point of support. This coupling system is illustrated on FIG. 2. The arrangement of the levers 3a and 4a is identical to that of the levers 3b and 4b.

The left end of the lever 4a of FIG. 2 is provided with a notch 7 which receives the knife 8 of the coupling system 9. This coupling system comprises a knife 10 which is engaged in the notch 11 of the lever 3a. This notch 11 is located approximately at mid-length on the lever 3a.

The short lever 4a is hence suspended by its left end on the long lever 3a; the short lever 4b is suspended in the same way on the lever 3b by means of a coupling system 9a identical to 9 (FIG. 1).

Furthermore, each lever is provided with a notch which is intended to receive one of the four knives of the tray. 12, 13, 14 and 15 are the notches on the levers 3a, 4a, 3b and 4b respectively.

The base 1 is provided with 4 embossments 16 which have been bored through; the tray is positioned on the base by engaging the 4 short rods underneath the tray into these holes 17. The tray is not shown on the drawings.

The spring for measuring the weight consists of a steel blade 18 firmly fixed on a portion of its length on a supporting element 19, which is attached to the base 1. The remaining length of the blade is free and is provided with one or several gauges 20 for measuring its bending. The gauge or gauges are connected to a readout system through an electric circuit (not shown).

An element 21, made of a metal that can be cold-pressed, is fitted on the free end of the blade 18. This element is held in position by two embossments 22 engaged in corresponding bores 23 in the blade 18. The metal element 21 is fixed on the blade 18 by means of two short pins which are inserted into the bore 25 of the blade 18 and thereafter bent outwards until flattened against the lower face of the blade 18.

The reason for fitting such an element 21 on the blade 18 is that the element 21 is provided with a notch or a U-shaped groove 26 which would be difficult to realise on a steel blade.

The long levers 3a and 3b are provided at their right hand side end with the elements 27a and 27b made, for example, of plastic material. These elements 27a and 27b have a rounded contact surface of a small radius 28.

The levers 3a and 3b are coupled with the steel blade 18 by means of a force transmitting system further described. The force transmitting system comprises a rectangular window, one side of which (31) having been shaped into a knife. When assembling the scale, the end portion 32 of the metal element 21 is introduced into the window 30. The end portion 32 is narrower than the main body of the metal element 21, which has the same width as the blade 18. The knife shaped side 31 of the window is engaged into the notch or groove 26. The force transmitting system is thus assembled. Portion 32 is then inserted into the rubber or plastic blocking element 33, the purpose of which is to hold the force transmitting system once assembled in position.

As shown on FIG. 4 and FIG. 5, the force transmitting system is shaped so as to engage the ends of the levers 3a and 3b and their plastic elements 27 with their rounded contact surface 28.

The plastic elements 27a and 27b are of a general cylindrical shape, and of a small diameter. They are installed alongside each other inside the force transmitting system 29 as shown on FIG. 5. The bended sides 34 and 35 of the force transmitting system have for purpose to hold the elements 27a and 27b side by side in a symetrical position to the plane of symetry of the steel blade 18.

This arrangement reduces to a minimum the effect of of an uneven loading of the tray or of a slight deformation of the tray or base. The distance between the axes of the elements 27a and 27b is so short, that in most circumstances, the forces applied on the levers 3a, 4a, 3b and 4b are transmitted to the blade 18 as a vertical force, located in the plane of symetry of the blade.

It should be noted, that the reasons why the steel blade 18 can not be bent in a manner where the gauges would record an erroneous weight are the following: the knife 31 is much shorter than the blade 18 is wide; the distance between the axes of the elements 27a and 27b is shorter than the length of the knife 31; the notch 26 and the points of contact between the elements 27a, 27b and the force transmitting system 29 are in the same vertical plane. In these circumstances, the force applied on the blade can only be vertical.

Therefore, to obtain an accurate measurement, the forces exerted by the two levers 3a and 3b must be transmitted independently to the steel blade 18, the direction of these forces vertical, and the distance from the plane of symetry of the blade at which the forces are exerted kept minimal. When these conditions are satisfied, the forces applied on the steel blade are strictly equal or proportional to the load on the tray.

Figure 6:
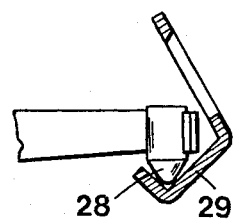
FIG. 6 shows enlarged a detail of FIG. 4.
Figure 7:
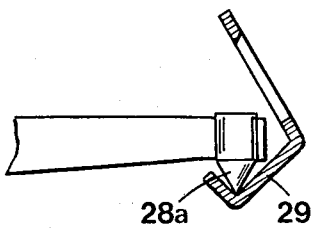
FIG. 7 is similar to FIG. 6 and illustrates a first modification of the preferred embodiment of the present invention.

FIG. 6 shows at a larger scale how the elements 27a and 27b are engaged with the force transmitting system. In FIG. 7, the contact surfaces 28, instead of being rounded, have a conical shape, which reduces friction and increases the accuracy of measurement.

Figure 8:
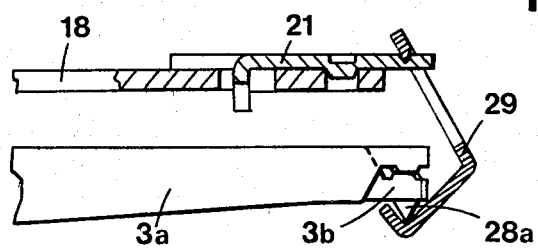
FIG. 8 shows the cross-section 8—8 of FIG. 9 and illustrates a second modification.
Figure 9:
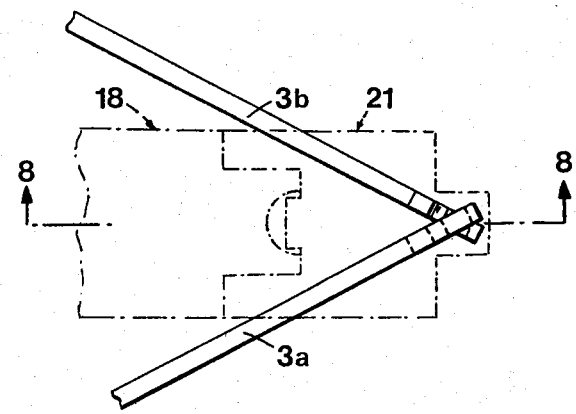
FIG. 9 is a view from above of a similar structural element as shown in FIG. 3 and illustrates the second modification.
Figure 10:
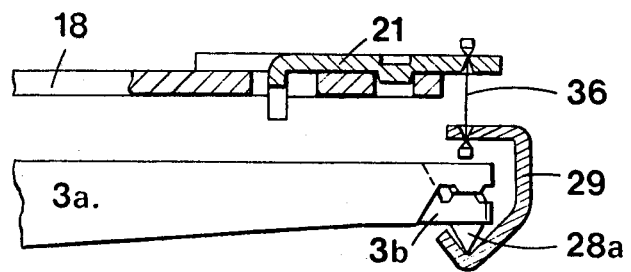
FIG. 10 is similar to FIG. 8 and illustrates a third modification.

In FIGS. 8 and 9, the levers 3a and 3b are arranged in such a manner as to exert their force (through a force transmitting system such as 29 or other) at one same point, located in the plane of symetry of the steel blade. In FIG. 10, the force transmitting system 29 is linked to the steel blade by a vertical wire 36 situated in the plane of symetry of the blade.

Figure 11:
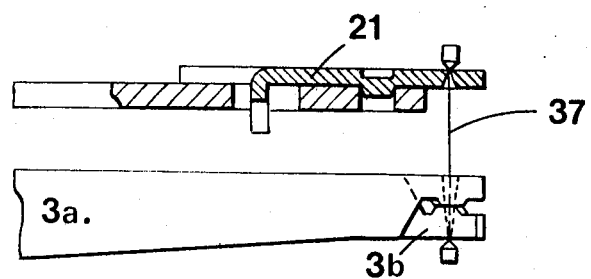
FIG. 11 is similar to FIG. 10 and illustrates a fourth modification.

In FIG. 11, the levers 3a and 3b being positioned as in FIGS. 8 and 9, the force transmitting system 29 with its knife 31 set in the notch 26 as described in FIGS. 3 and 4 is replaced by a wire 37.

In FIGS. 12 and 13, the free portion of the steel blade 18 has been divided by a slit to form two separate blades 18a and 18b. In this case, the levers 3a and 3b are also separate, each lever being attached to one of the blades 18a or 18b at their mid-width by means of a vertical wire 38a or 38b. Both blades are provided with one or several gauges 39a and 39b for measuring their bending. With such an arrangement, no undesired bending of the steel blades can occur.

We claim:

1. Weighing apparatus for use as scale for persons, comprising a base (1) and weighing mechanism supporting a tray designed to receive the load to be weighed and to be vertically mobile, the weighing mechanism consisting of four levers (3a, 3b, 4a, and 4b) pivoting at their points of support located on the base at the four corners of a rectangle, two of the levers (3a, 3b) being fixed to a flat spring (18) provided with at least one gauge (20) connected to a read-out system through an electric circuit for measuring the bending of the spring, the two other levers (4a, 4b) which are shorter being coupled by the ends which are opposite to their points of support with the levers 3a and 3b at some point on these levers located between their ends,
    characterized by a force transmitting member (29) hanging to the flat spring (18) and on which member (29) the free end of the two long levers (3a, 3b) which are structurally separate, rest 6.

2. Weighing apparatus according to claim 1, wherein the force transmitting member (29) is suspended to the flat spring (18) by a knife groove system (26), whereas the free end of the long levers (3, 3a) cooperates with said member (29) by a mechanism comprising a rounded surface (28) engaged in a groove of said member.

3. Apparatus according to claim 1 or 2, characterized by the force transmitting system (29) being provided with an opening (30) into which the free side (21, 32) of the flat spring (18) is engaged, one side of the opening having the shape of a knife (31) which is set in a notch (26) on the flat spring (21,18).

4. Apparatus according to claim 3, characterized by the flat spring consisting of a steel blade (18) and an end element (21), made of a metal which can be cold-pressed, fixed on the steel blade and provided with a notch (26) into which the knife (31) is engaged.

5. Apparatus according to claim 3, characterized by the points of contact between the force transmitting system (29) and the force transmitting elements (27a and 27b) being in the same vertical plane as the notch (26) through which the force transmitting system is suspended to the flat spring (18) by means of a knife (31).

* * * * *